May 21, 1968  D. HUTCHINSON  3,384,520

FIRE HOSE

Filed Jan. 15, 1965

INVENTOR
Dennis Hutchinson

By Watson, Cole, Grindle & Watson
ATTORNEYS

3,384,520
FIRE HOSE
Dennis Hutchinson, Caton, near Lancaster, England, assignor to George Angus & Company Limited, Newcastle-upon-Tyne, Northumberland, England, an English company
Filed Jan. 15, 1965, Ser. No. 425,851
Claims priority, application Great Britain, Feb. 4, 1964, 4,684/64
7 Claims. (Cl. 156—156)

ABSTRACT OF THE DISCLOSURE

A method is disclosed for making a lined fire hose comprising inserting a lining tube into an open woven textile jacket, inflating the jacket and lining tube, applying at least one layer of a fluid uncured thermoplastic material and applying heat after each layer has been applied to cure the covering material and cause it to become bonded to the lining tube.

---

Fire hose is frequently provided with an internal lining of material impervious to water and normally the lining tube is provided with an external coating of adhesive, for bonding it to the jacket of the hose, before it is drawn into the jacket, or adhesive is introduced and spread between the lining and the jacket after the lining has been drawn into the jacket.

The invention provides a method of making a lined fire hose which comprises introducing into an open woven jacket of textile material a lining tube of natural or synthetic rubber or plastic material, inflating the lining tube by internal fluid pressure, applying externally to the inflated hose a rubber or plastic material in paste or liquid form capable of penetrating the jacket and applying heat to gel or cross-link the externally applied material and cause it to become bonded to the lining tube. A second coating may be applied to give enhanced abrasion resistance.

By stating that the jacket is open woven, I mean that the weave is sufficiently open to permit of passage of the liquid rubber or plastic upon scraping of the externally applied rubber or plastic, as by passage of a diaphragm over the exterior of the hose. Conventional fire hose jackets generally incorporate some staple yarn in the warp to close the weave and improve abrasion resistance. It is preferred to use in the process according to the invention a jacket having continuous filament warps. In conventional fire hose jackets, the warps are tightly packed together. In a typical case there may be 50 warps per inch of hose periphery. A hose jacket suitable for the purposes of the invention and having warps of the same diameter may contain 14–30 warps per inch of those periphery.

Preferably the lining tube is of a blend of polyvinyl chloride and nitrile rubber and the externally applied plastic is a polyvinyl chloride paste. The lining tube may, however, be of nylon or polyethylene terephthalate (e.g. Melinex) and the externally applied plastic may be a polyurethane adhesive.

When the externally applied coating material is polyvinyl chloride paste the effect of the applied heat is primarily a physical one, the heat causing the material to gel, i.e. to change from a dispersion of polyvinyl chloride in plasticizer to a dispersion of plasticizer in polyvinyl chloride. When the coating material is a polyurethane adhesive or other rubber the effect of the applied heat is a chemical one, the heat causing cross-linking of the coating material to occur. Both gelation and cross-linking are comprehended within the generic term curing.

One example of the manufacture of fire hose according to the invention will now be given, reference being made to accompanying diagrammatic drawings, in which.

Figures 1, 2, 3:
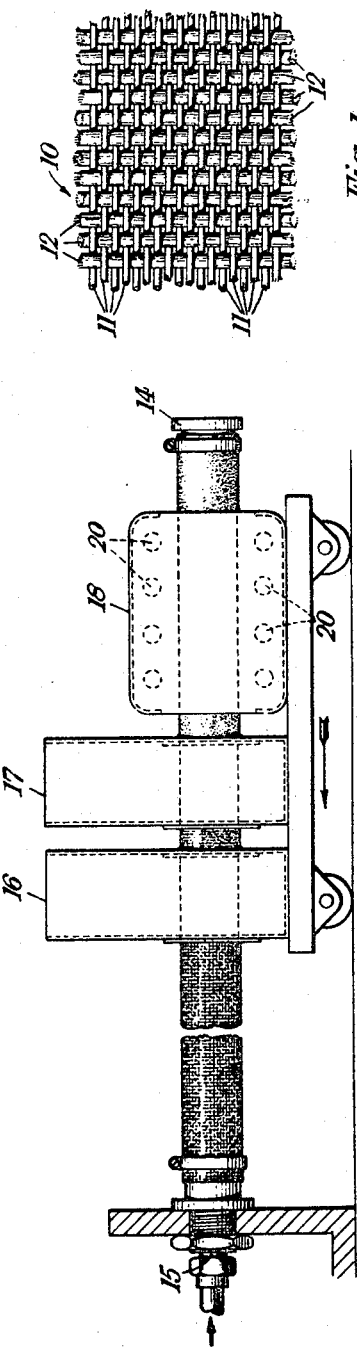
FIG. 1 is a greatly enlarged view of part of the jacket of the hose.
FIG. 2 is a side elevation of the apparatus used for applying the external plastic to the hose.
FIG. 3 is a section of part of the apparatus on a larger scale.

As will be seen from FIG. 1, the hose jacket 10, which is of all synthetic yarn, has an open weave, the warps being indicated at 11 and the weft at 12. After introducing a lining tube 13, of polyvinyl chloride-nitrile rubber, into the jacket, a plug 14 is introduced into one end of the hose and an air inlet fitting 1 is introduced into the other end of the hose. The hose is then inflated, as shown in FIG. 2, by admitting compressed air at a pressure of 30 p.s.i. into it through the fitting 15.

Two paste boxes 16, 17 and a heater box 18 are then drawn over the hose as indicated in FIG. 2. The paste boxes, which carry rubber diaphragms 19 at their ends, apply polyvinyl chloride paste to the exterior of the hose. The paste penetrates through the open weave of the jacket into contact with the lining tube 13 and the paste is gelled, by infrared heaters 20 in the heater box 18, so effecting bonding of the external plastic coating 21 on the hose with the lining tube 13.

The first paste box 16 contains a special P.V.C. plastisol which has the necessary flow, low temperature fusion and adhesive properties, whereas the second paste box 17 contains either a conventional P.V.C. plastisol or one having certain additions to give better rheological properties.

The hose jacket 10 may be woven to the following specification for 2½" diameter hose:

*For a hose having a bursting pressure of 500 p.s.i.*

Warp: 154 ends 2/840 denier nylon 66 type 900.
Weft: 6/840 denier Nylon 66 Type 900.
(10 picks per inch.)

*Lining manufacture*

The lining may be of the following formulation:

| | |
|---|---|
| Pre-masticated Butakon AC. 5502 | 100 |
| MC sulphur | 0.5 |
| Zinc oxide | 5 |
| Agerite white | 2 |
| Stearic acid | 1 |
| Philblack "A" | 40 |
| D.I.O.S. | 15 |
| Diolpate 195 | 15 |
| T.M.T. | 3 |

The lining tube 13 is extruded to give a flat width of 3.75" and a thickness of 0.030"–0.035". Autoclave cure is 10 minutes at 40 p.s.i. steam pressure and the minimum physical properties desired from the lining at this stage are:

| | |
|---|---|
| Modulus at 300% extension p.s.i. | 1000 |
| Tensile strength at break p.s.i. | 2000 |
| Elongation at break percent | 400 |

P.V.C. PLANT DETAILS

*Adhesive plastisol used in the 1st paste box 16*

| | |
|---|---|
| An emulsion type polymer of polyvinyl chloride of medium molecular weight | 100 |
| Butyl benzylphthalate (BBP) | 80 |
| Stanclere 70A | 1.5 |
| Mystoc L.P.L. 100% | 2.0 |
| Pigment | 3 |

*Coating plastisol used in the 2nd paste box 17*

(1)

| | |
|---|---|
| Emulsion type P.V.C. polymer | 100 |
| Dioctyl phthalate | 68 |
| Diolpate 195 | 20 |
| Stanclere 70 | 1.5 |
| Mystoc L.P.L. 100% | 0.5 |
| Pigment | 3 | or (2) As in (1), but with addition of CHYNO No. 3 Clay (28 parts to 100 parts of paste).

What I claim as my invention and desire to secure by Letters Patent is:

1. A method of making a lined fire hose which comprises introducing into an open woven jacket of textile material a lining tube made of a material selected from the group consisting of natural and synthetic rubber and thermoplastic materials, inflating the lining tube and jacket by application of internal fluid pressure, applying externally to the inflated jacket a layer of cold, fluid, uncured covering material selected from the group consisting of rubber and polyvinyl chloride, scraping said layer to cause said covering material to penetrate the jacket and flow into contact with the lining tube and thereafter applying heat to cure said covering material and cause it to become bonded to the lining tube.

2. A method as claimed in claim 1 which includes the step of applying to the inflated jacket a second layer of said fluid covering material prior to the application of heat.

3. A method as claimed in claim 1 in which the jacket has continuous filament warps.

4. A method as claimed in claim 3 wherein said jacket contains 14 to 30 warps per inch of hose periphery.

5. A method as claimed in claim 1 in which the covering material comprises a plastic taken from the group consisting of polyurethane and polyvinyl chloride.

6. A method as claimed in claim 1 in which the material of the lining tube is a blend of polyvinyl chloride and nitrile rubber.

7. A method as claimed in claim 1 in which the material of the lining tube is taken from the group consisting of nylon and polyethylene terephthalate.

References Cited

UNITED STATES PATENTS

| | | | |
|---|---|---|---|
| 1,190,292 | 7/1916 | Hopkins | 156—149 |
| 1,974,211 | 9/1934 | Freeman et al. | 156—287 |
| 2,262,514 | 11/1941 | Pape | 156—156 XR |
| 2,611,721 | 9/1952 | Brees | 156—287 |
| 2,888,954 | 6/1959 | Gates | 156—149 XR |
| 3,049,762 | 8/1962 | Jackson | 156—149 |
| 3,284,259 | 11/1966 | Galloway et al. | 156—149 |

FOREIGN PATENTS 617,131   3/1961   Canada.

EARL M. BERGERT, *Primary Examiner.*

M. L. KATZ, *Assistant Examiner.*